(12) United States Patent
Dietz et al.

(10) Patent No.: US 8,555,182 B2
(45) Date of Patent: Oct. 8, 2013

(54) INTERFACE FOR MANAGING SEARCH TERM IMPORTANCE RELATIONSHIPS

(75) Inventors: Robert S. Dietz, Bellevue, WA (US); Douglas W. Herman, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 313 days.

(21) Appl. No.: 11/448,472

(22) Filed: Jun. 7, 2006

(65) Prior Publication Data

US 2007/0288498 A1    Dec. 13, 2007

(51) Int. Cl.
  *G06F 3/048*    (2013.01)
(52) U.S. Cl.
  USPC ........... 715/764; 715/968; 707/705; 707/706; 707/713; 707/722; 707/723; 707/727; 707/728; 707/748; 707/752; 707/759; 707/765; 707/766
(58) Field of Classification Search
  USPC .................... 715/764, 968; 707/1, 2, 3, 4, 5, 707/705, 715, 722, 723, 706, 713, 727, 728, 707/748, 752, 759, 765, 766
  See application file for complete search history.

(56) References Cited

U.S. PATENT DOCUMENTS

| | | | | |
|---|---|---|---|---|
| 5,175,814 A | * | 12/1992 | Anick et al. | 715/835 |
| 5,515,488 A | * | 5/1996 | Hoppe et al. | 345/440 |
| 5,847,708 A | * | 12/1998 | Wolff | 715/764 |
| 5,913,215 A | * | 6/1999 | Rubinstein et al. | 707/708 |
| 5,946,678 A | | 8/1999 | Aalbersberg | |
| 5,982,369 A | * | 11/1999 | Sciammarella et al. | 715/835 |
| 6,003,034 A | * | 12/1999 | Tuli | 1/1 |
| 6,012,053 A | | 1/2000 | Pant et al. | |
| 6,057,836 A | * | 5/2000 | Kavalam et al. | 715/779 |
| 6,208,985 B1 | * | 3/2001 | Krehel | 707/3 |
| 6,326,962 B1 | * | 12/2001 | Szabo | 715/762 |
| 6,327,589 B1 | * | 12/2001 | Blewett et al. | 1/1 |
| 6,434,556 B1 | * | 8/2002 | Levin et al. | 707/5 |
| 6,463,431 B1 | * | 10/2002 | Schmitt | 707/5 |
| 6,594,658 B2 | * | 7/2003 | Woods | 707/5 |
| 6,629,097 B1 | * | 9/2003 | Keith | 707/5 |
| 6,658,404 B1 | * | 12/2003 | Cecchini | 707/758 |
| 6,662,177 B1 | | 12/2003 | Martino et al. | |
| 6,760,720 B1 | * | 7/2004 | De Bellis | 707/706 |
| 6,768,997 B2 | * | 7/2004 | Schirmer et al. | 707/102 |

(Continued)

FOREIGN PATENT DOCUMENTS

EP    1 643 383 A1    4/2006

OTHER PUBLICATIONS

Pinkerton, "Finding What People Want: Experiences with the WebCrawler," Second International WWW Conference, 1994 http://www.thinkpink.com/bp/WebCrawler/WWW94.html.

(Continued)

*Primary Examiner* — Patrick Riegler
(74) *Attorney, Agent, or Firm* — Vierra Magen Marcus LLP

(57) ABSTRACT

A graphical user interface is disclosed for management and easy reorganization of graphical objects displayed over the graphical user interface. The graphical user interface may relate to prioritizing and organizing the results of a database search. The graphical user interface may alternatively relate to prioritizing and organizing graphic objects such as personalized topics on a homepage and formatting icons in a productivity application program, such as a word processing application program, a spreadsheet application program, a presentation application program and a drawing application program.

17 Claims, 14 Drawing Sheets

(56) References Cited

U.S. PATENT DOCUMENTS

| | | | |
|---|---|---|---|
| 6,778,193 B2 * | 8/2004 | Biebesheimer et al. ...... 715/805 |
| 6,907,424 B1 | 6/2005 | Neal et al. |
| 6,925,608 B1 | 8/2005 | Neale et al. |
| 6,937,254 B2 * | 8/2005 | Nishiyama et al. ............ 345/619 |
| 6,963,867 B2 * | 11/2005 | Ford et al. ........................ 707/3 |
| 7,058,624 B2 * | 6/2006 | Masters ........................... 707/3 |
| 7,386,540 B2 * | 6/2008 | Anderson et al. ................ 707/3 |
| 7,788,261 B2 * | 8/2010 | Hoeber et al. ................. 707/728 |
| 7,953,730 B1 * | 5/2011 | Bleckner et al. .............. 707/722 |
| 8,060,501 B1 * | 11/2011 | Harik et al. ................... 707/724 |
| 2002/0059297 A1 * | 5/2002 | Schirmer et al. ............. 707/104.1 |
| 2002/0103798 A1 * | 8/2002 | Abrol et al. ........................ 707/5 |
| 2002/0105550 A1 * | 8/2002 | Biebesheimer et al. ...... 345/835 |
| 2002/0165855 A1 * | 11/2002 | Ohtomo ............................ 707/3 |
| 2003/0140059 A1 * | 7/2003 | Ishizaka ...................... 707/103 R |
| 2004/0064447 A1 | 4/2004 | Simske et al. |
| 2005/0134578 A1 | 6/2005 | Chambers et al. ............. 345/184 |
| 2005/0187911 A1 * | 8/2005 | Tunning ............................ 707/3 |
| 2005/0187920 A1 * | 8/2005 | Tenembaum et al. ............ 707/3 |
| 2005/0187931 A1 * | 8/2005 | Cofino et al. ..................... 707/5 |
| 2005/0222993 A1 * | 10/2005 | Ohtomo ............................ 707/3 |
| 2005/0262050 A1 | 11/2005 | Fagin et al. |
| 2005/0283466 A1 * | 12/2005 | Dettinger et al. ................. 707/3 |
| 2005/0283473 A1 * | 12/2005 | Rousso et al. ..................... 707/5 |
| 2005/0289140 A1 | 12/2005 | Ford et al. |
| 2006/0004711 A1 | 1/2006 | Naam |
| 2006/0004734 A1 * | 1/2006 | Malkin et al. .................... 707/4 |
| 2006/0004891 A1 | 1/2006 | Hurst-Hiller et al. |
| 2006/0031214 A1 | 2/2006 | Solaro et al. |
| 2006/0047643 A1 | 3/2006 | Chaman |
| 2006/0064411 A1 | 3/2006 | Gross et al. |
| 2006/0069663 A1 | 3/2006 | Adar et al. |
| 2006/0074883 A1 * | 4/2006 | Teevan et al. ..................... 707/3 |
| 2006/0085395 A1 * | 4/2006 | Cradick et al. .................... 707/3 |
| 2006/0106793 A1 * | 5/2006 | Liang ................................ 707/5 |
| 2006/0218140 A1 * | 9/2006 | Whitney et al. .................. 707/5 |
| 2007/0179940 A1 * | 8/2007 | Robinson et al. ................ 707/4 |
| 2007/0192281 A1 * | 8/2007 | Cradick et al. .................... 707/2 |
| 2008/0208819 A1 * | 8/2008 | Wang et al. ...................... 707/3 |
| 2009/0100019 A1 * | 4/2009 | White et al. ...................... 707/3 |

OTHER PUBLICATIONS

Zamir et al., "Web Document Clustering: A Feasibility Demonstration," 1998 http://www.cba.ua.edu/~mhardin/wedcluster.pdf.

Lau et al., "Patterns of Search: Analyzing and Modeling Web Query Refinement" http://bistrica.usask.ca/UM/UM99/Proc/lau.pdf.

* cited by examiner

INTERFACE FOR MANAGING SEARCH TERM IMPORTANCE RELATIONSHIPS

BACKGROUND

Online search engines provide an enormously powerful tool for accessing the vast amount of information available on the Internet in a structured and discriminating scheme. Popular search engines such as MSN®, Google® and Yahoo!® service tens of millions of queries for information every day. A typical search engine operates by a coordinated set of programs including a spider (also referred to as a "crawler" or "bot") that gathers information from web pages on the World Wide Web in order to create entries for a search engine index; an indexing program that creates the index from the web pages that have been read; and a search program that receives a search query, compares it to the entries in the index, and returns results appropriate to the search query.

In typical search engines, search terms are weighted the same, and do not have a means for expressing relative importance of one search term relative to another. If a search is performed relating to real estate for example, and the formulated search query includes number of bedrooms, price, and square footage, the search engine will weigh each of these equally when generating the results. While there are search engines that do allow weighted searches, these search engines are cumbersome in that they do not allow the user to re-sort the results simply by reformulating the relative importance of terms in the search query. If a user wishes to alter the relative importance of search terms to obtain a reordering of the search results, a brand new search must be performed. At present, there is no convenient method for reordering search results without performing a whole new search.

Moreover, search results are typically provided as lines of text on the user interface, with the user having to sift through pages and pages of information to review the search results. This process is generally time consuming and tiresome.

A different but related concept is the organization of user-customized web portals, or homepages. At present, it is known for a user to populate a homepage on the user's graphical interface with content of interest to the user. The user may customize their webpage to receive content relating to a variety of topics, including for example current events, sports, hobbies, finance, etc. In order to reorganize the content on their webpage, the user must typically access a setup screen on the graphical user interface, and then select/deselect content, as well as indicating the desired position on the page. At present, there is no convenient method for reorganizing content without accessing the setup screen. The same is true for the organization of content across a wide variety of other software application programs which provide content to a user via a graphical user interface.

SUMMARY

Embodiments of the present system in general relate to a graphical user interface for management and easy reorganization of graphical objects displayed over the graphical user interface. In one embodiment, the graphical user interface relates to prioritizing and organizing the results of a database search. In further embodiments, the graphical user interface relates to prioritizing and organizing graphic objects such as personalized topics on a homepage and formatting icons in a productivity application program, such as a word processing application program, a spreadsheet application program, a presentation application program and a drawing application program.

According to an embodiment of the present system for prioritizing and organizing the results of a database search, the user interface may include a query and prioritization area having a search field, a graphical magnet bar, and a reference position in the form of a graphical center magnet. The graphical user interface may further include a prime viewing area and a reserve viewing area in which the search results may be displayed.

After initiating a search on a search term, the search term appears as a graphical object within the magnet bar, where it may be repositioned as desired to set its priority. In particular, in accordance with an aspect of the present system, the importance of a search term may be set by a user based on the object's distance away from the center magnet. A user may select the object representing the search term and move it away from the center magnet. The farther the object is moved from the magnet, the less important that search term becomes in the ranking of the results. A mathematical algorithm may be employed which takes into account the distance between a search term object and the center magnet when calculating the relevance ranking (i.e., the priority) of the results. A given result will be displayed either in the prime viewing area or the reserve viewing area, depending on the relevance ranking it receives.

A user may perform multiple searches on multiple search terms. In accordance with a further aspect of the present system, once a new database search is performed on a newly added search term, the relevance ranking for all of the search results (existing search results and newly added search results) is calculated. This may have a few effects. First, newly added search results having a relevance ranking above the threshold are added to the prime viewing area. To the extent newly added results have higher relevance rankings than the existing search results, the results in the prime viewing area are reordered on the interface. Second, as a result of the recalculation of the relevance ranking of the existing search results, the relevance ranking for one or more of the existing results may fall below the priority threshold. In this instance, these results are moved from the prime viewing area to the reserve viewing area on the interface.

In a further aspect of the present system, not only can a user set an overall importance of a search term in a search, the user may also indicate a relative importance of a first search term to a second search term. In particular, a user may place two or more search terms close to one another on the magnet bar. In so doing, the user indicates that it is important that these two or more terms be linked together in the search results, and results having these two or more terms will receive a bonus to their overall relevance ranking.

The present system provides an easy to use and easy to understand graphical user interface where a user may easily change the relative importance of a search term and have the effect of that change of importance immediately show up in a new ranking of the results for the user's search. Moreover, all reordering of search results upon a change of importance of one or more of the search terms may be done without performing a brand new search of the Internet or external structured database. All operations for reordering results are performed on the results which have been downloaded and stored in local memory.

The present system may be used on a wide variety of graphical user interfaces outside of those used for search queries. One additional use of the present system includes customizing and prioritizing a user's homepage. Further embodiments of the present system may be used in a productivity application program, such as a word processing application program. In a further embodiment of the present system, a magnet bar may be incorporated into a user interface for an email application program.

DETAILED DESCRIPTION

The present system will now be described with reference to FIGS. 1 through 16, which in embodiments relate to a graphical user interface for management and easy reorganization of graphical objects displayed over the graphical user interface. In one embodiment, the graphical user interface relates to prioritizing and organizing the results of a database search. In further embodiments, the graphical user interface relates to prioritizing and organizing graphic objects such as personalized topics on a homepage and formatting icons in a productivity application program, such as Word for Windows by Microsoft Corporation of Redmond, Wash.

Figure 1:
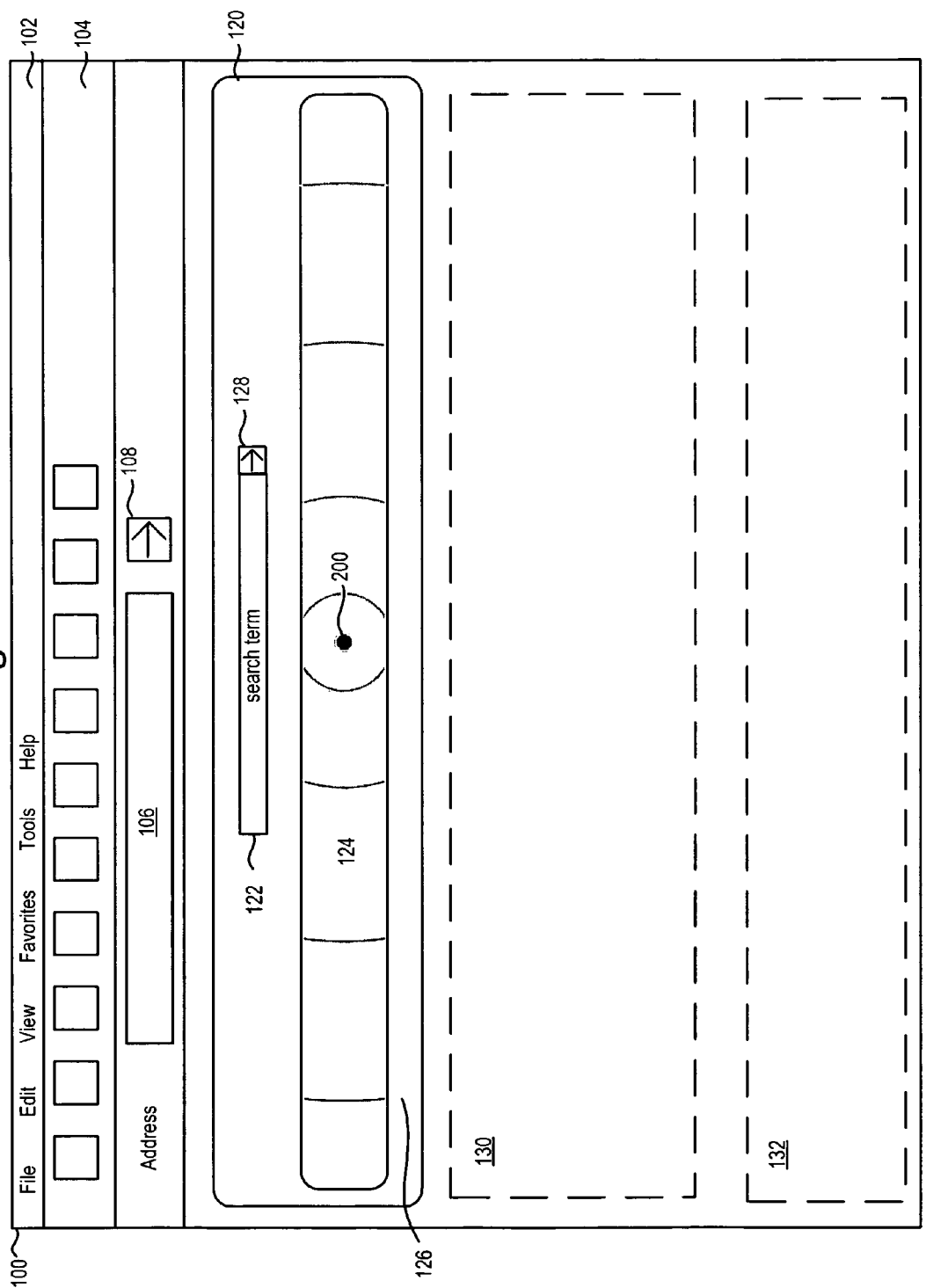
FIG. 1 is a graphical user interface according to embodiments of the present system.
Figure 2:
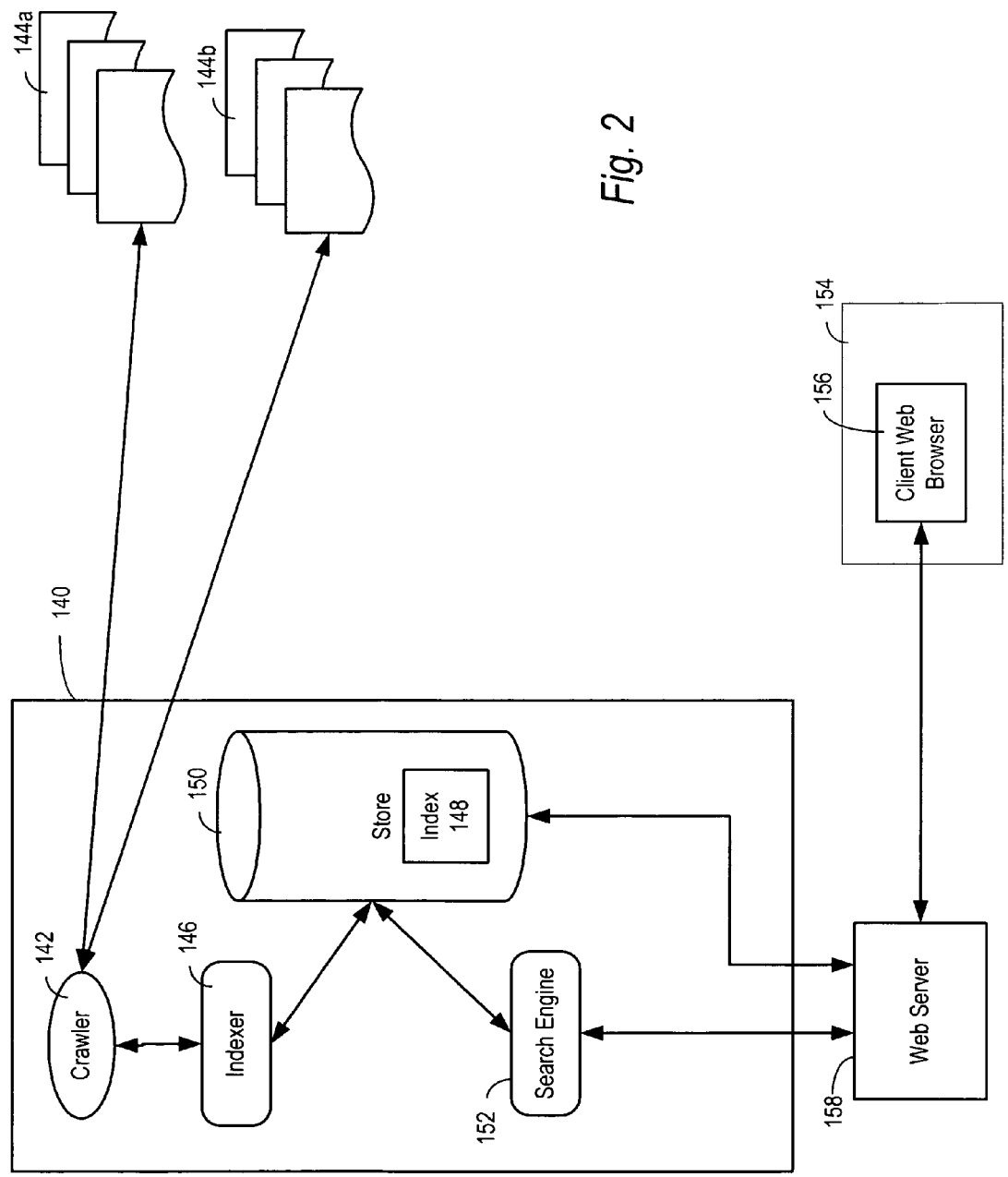
FIG. 2 is a block diagram of an embodiment of a search engine for use with the present system.

An embodiment of the present system relating to prioritizing and organizing the results of a database search will now be described with reference to FIG. 1. Graphical user interface 100 includes toolbar 102 with several drop down menus. Each drop down menu is identified by a title such as File, Edit, View, Favorites, Tools, and Help. In one embodiment, user interface 100 is provided within an Internet browser. One example of an Internet browser is Internet Explorer from Microsoft Corporation. Graphical user interface 100 also includes toolbar 104, which includes several tools associated with the browser. The browser also includes an address field 106 and a "go" button 108. By inserting an address in address field 106 and selecting "go" button 108, the browser navigates to the address inserted in the address field 106 as is known in the art. A user attempting to use the browser to access a search engine would insert the address for the search engine in address field 106.

According to embodiments of the present system, user interface 100 further includes a query and prioritization area 120 having a search field 122, a magnet bar 124, an inactive area 126 and a reference position referred to herein as the center magnet 200. Search field 122 is provided for entering search terms in order to initiate a search on the Internet (or within another domain). After entering a search term in field 122, the user would select button 128 to initiate the search. The magnet bar 124 and center magnet 200 may be graphical objects defined in a markup language to be presented by a browser on the graphical user interface 100 as shown in FIG. 1. Where graphical user interface 100 is part of an application program not using a browser, the graphical objects 124 and 200 may be presented by the application program on the interface.

As explained in greater detail hereinafter, after initiating a search on a search term, the search term appears within magnet bar 124, where it may be positioned as desired to set its priority. Graphical user interface 100 further includes a prime viewing area 130 and a reserve viewing area 132 in which the search results may be displayed. In embodiments, the actual boundaries for areas 130 and 132 would not be displayed on interface 100, but the boundaries for these areas may be displayed in further embodiments.

As explained hereinafter, the results of the search are displayed as graphical objects within the prime viewing area 130 and reserve viewing area 132, with the higher priority results appearing in the prime viewing area 130. Many cultures read from top to bottom. Accordingly, in embodiments, the prime viewing area 130 is on top. It is understood that the prime viewing area may be on the bottom, or that the prime and reserve viewing areas may be arranged side-by-side, horizontally on the interface 100.

Upon initiation of a search on a formulated query, an Internet (or other domain) search may be performed using a search processing environment of known configuration. One such configuration of a search processing environment 140 is shown as a block diagram in FIG. 2. The search processing environment 140 can operate with and/or as part of the computing system environment 300 explained hereinafter with respect to FIG. 16. Search processing environment 140 may be a crawler-based system having three major elements. The first element is the spider, also called the crawler 142. The spider visits a web page 144a, 144b, etc., reads it, and then follows links to other pages within the site. The spider returns to the site on a regular basis to look for changes. The basic algorithm executed by any web crawler takes a list of seed URLs as its input and repeatedly performs the operations of: removing a URL from the URL list, determining the IP address of its host name, downloading the corresponding document, and extracting any links contained in it. For each of the extracted links, the spider translates it to an absolute URL (if necessary), and adds it to the list of URLs to download, provided it has not been encountered before.

Everything the spider returns is catalogued by an indexer 146 in the second part of the search engine, the index 148. The index 148, sometimes called the catalog, is a repository containing a copy of every web page that the spider finds. If a web page changes, then the index is updated with new information. The index 148 may be stored in a data store 150.

The third part of the search processing environment 140 is search engine 152. This is the program that sifts through the millions of pages recorded in the index to find matches to a search, and ranks them in order of what it believes is most relevant. As explained hereinafter, the present system employs a novel system for ranking results which overrides any ranking returned by the search engine. Searching through an index involves a user building a query and submitting it through the search engine. The query can be quite simple, a single word at minimum, or may be a series of words or phrases.

In practice, a user of a computing device 154 accesses search processing environment 140 via a web browser 156 on the client side and a web server 158 on the host server side. Once a communication link is established between client and host, a user of computing device 154 may perform query searches as described above.

Figure 3:
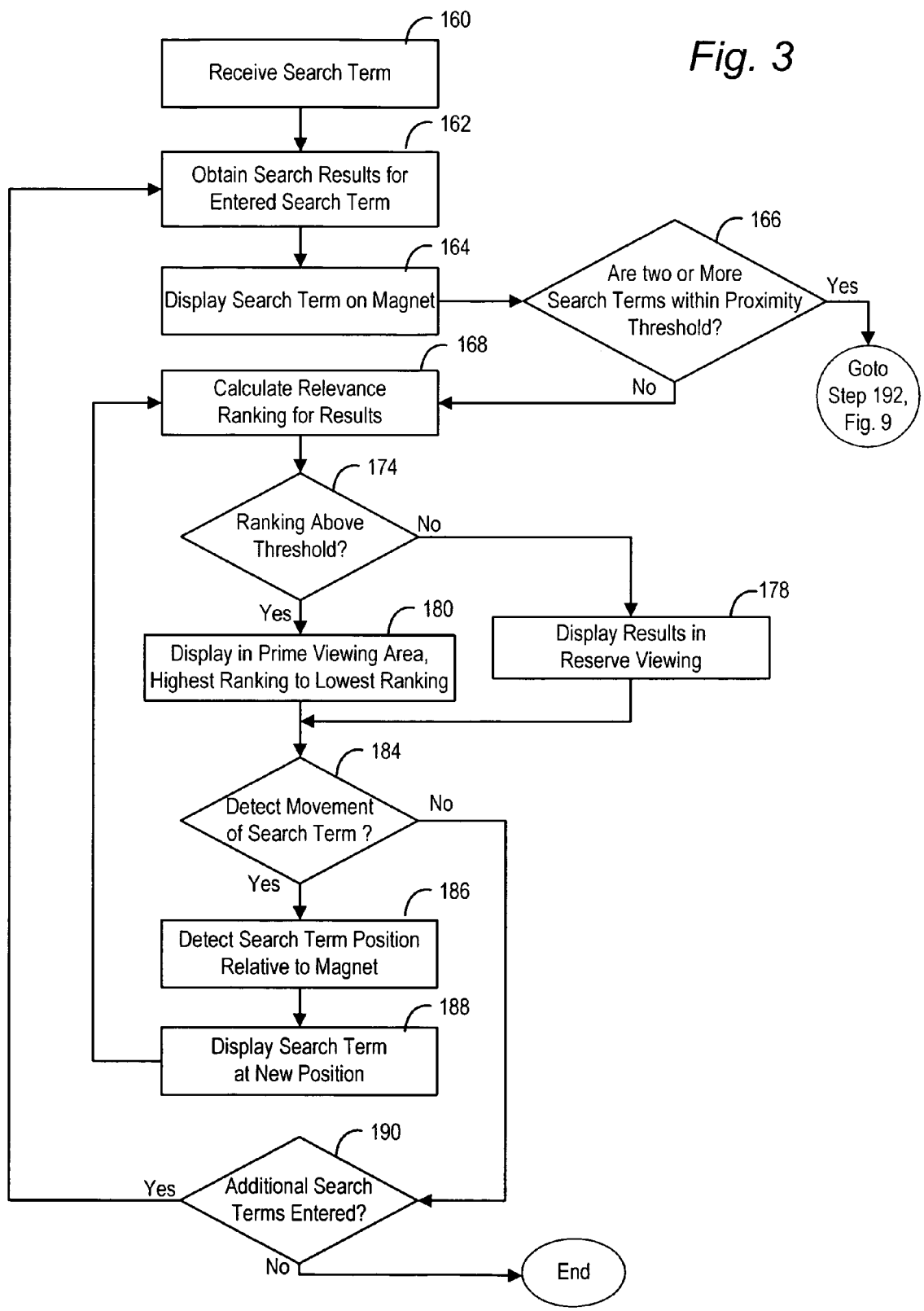
FIG. 3 is a flowchart showing the operation of embodiments of the present system.

Operation of an embodiment of the present system for prioritizing and positioning search results will now be described with reference to the flowchart of FIG. 3. Embodiments of the present system may be used to perform and prioritize searches from both structured and unstructured databases. A structured database is one including structured queries, or queries selected from a pre-defined set of queries offered to the user. An example may be a real estate web site, where a user is asked to specify a query from closed sets of queries, e.g., how many bedrooms, price, square footage, etc. An unstructured search is one in which the user may enter any, unstructured search query, and the searching environment culls its results from any publicly available source on the World Wide Web. Searches performed using known search engines such as MSN® search, Google® and Yahoo® are examples of unstructured searches. Except where noted, the following description of the operation of the present system with reference to the flowchart in FIG. 3 applies to both structured and unstructured searches.

In the following embodiments, the present system may be implemented in Java script or equivalent for interpretation by a conventional client web browser. In embodiments described hereinafter, the present system is described as being part of an application program. In these embodiments, the present system may comprise a dedicated portion of the application program.

In step 160, a search query is entered in the search field 122 and the search is initiated via search button 128 (or by hitting the enter key on a keyboard). A search is then performed in step 162 to return results relevant to the search term, (i.e., including the search term). For unstructured searches, the search processing environment 140 described above may be used. Structured searches may alternatively be performed as is known in the art. The results obtained from the search may be downloaded and stored in memory on the user's computing device (or elsewhere in alternative embodiments).

In step 164, the present system displays the search term on top of the center magnet 200. For example, as shown on user interface 100 of FIG. 4, the user entered a search query represented by the phrase "Term A" in search field 122. Upon initiating the search, an anchor for Term A is displayed directly over center magnet 200 along with a display of the search term ("Term A" in this example). It is understood that the anchor may be omitted in embodiments of the present system and the term alone would appear by itself over magnet 200. The search term and anchor, or the search term by itself, may be a graphical object displayed on the interface 100. As explained hereinafter, a user may reposition the graphical object representing the search term using an interface selection device such as a keyboard and/or a mouse or some other pointing device.

Figure 4:
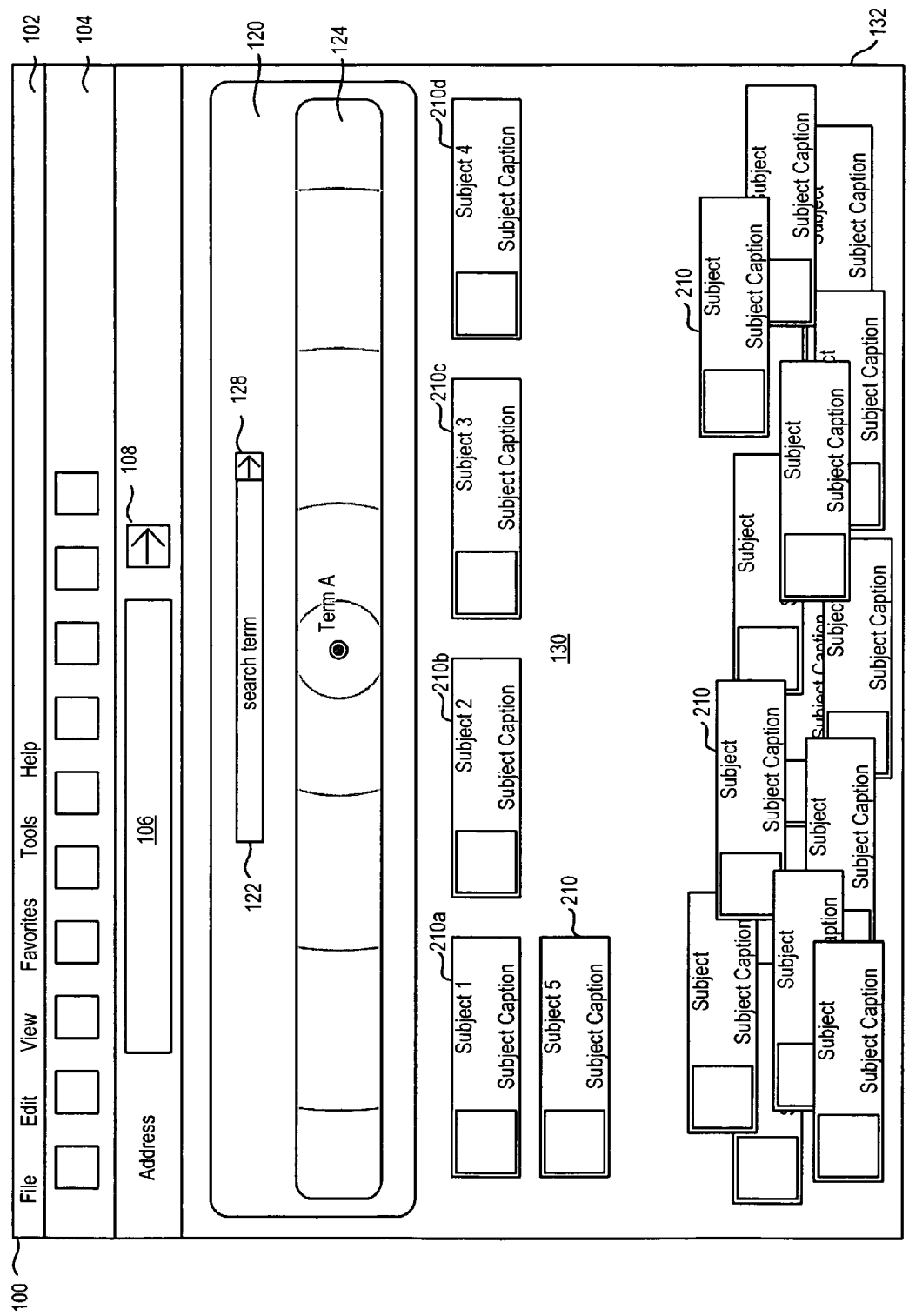
FIGS. 4-8 are various illustrations of a graphical user interface including a magnet bar and search results according to embodiments of the present system.

The present system checks in step 166 whether there are two or more search terms within an arbitrarily defined proximity threshold. Where there is only a single search term (as shown in FIG. 4), or where there are multiple search terms spaced apart from each other within magnet bar 124 a distance greater than the arbitrary proximity threshold, the present system then performs a step 168 of calculating a relevance ranking for each result. The steps performed where there are two or more search terms within the proximity threshold are described in greater detail below with respect to steps 192-194, FIG. 9.

In accordance with an aspect of the present system explained below with respect to FIGS. 4 and 5, the importance of a search term may be set based on its distance away from the center magnet 200. A user may select the object representing the search term and move it away from the center magnet 200. The farther the object is moved from the magnet 200, the less important that search term becomes in the ranking of the results. A mathematical algorithm is explained hereinafter which takes into account the distance between a search term object and the center magnet when calculating the relevance ranking (i.e., the priority) of the results. Thus, when an object representing the search term is moved relative to the center magnet, the relevance ranking of all the results are recalculated. If the object is moved closer to the center, the relevance ranking of the results including that term will increase. If the object is moved farther from the center, the relevance ranking of the results including that term will decrease. The disclosure hereinafter relating to moving a search term is understood to mean that the graphical object representing that search term is moved.

The present system calculates a relevance ranking for the search results in step 168. Further details relating to the algorithm for calculating the relevance ranking in step 168 are explained in greater detail below with respect to FIG. 10.

In step 174, the present system determines whether the relevance ranking calculated in step 168 is above an arbitrary priority threshold. If a relevance ranking of a given result is below the priority threshold, that result is displayed in step 178 in reserve viewing area 132. If a relevance ranking of a given result is above the priority threshold, that result is displayed in step 180 in prime viewing area 130. The position of a result within prime viewing area 130 is determined by its relevance ranking in comparison to other results displayed in prime viewing area 130. The highest ranked result is displayed in the highest priority position, which in embodiments, may be the upper left hand corner of the prime viewing area 130. However, as explained hereinafter, the highest priority position may be elsewhere within prime viewing area 130 in alternative embodiments.

In a further aspect of the present system, search results obtained and displayed in prime viewing area 130 or reserve viewing area 132 are displayed as graphical objects 210 as shown in FIG. 4. Each graphical object 210, referred to herein as a card, represents a search result obtained from the database search in step 162 and stored in memory on the user's computing device (or elsewhere). Each card 210 may include a visual and/or graphic indicator designating the web page indicated by the results. Each card 210 may be a hyperlink to the result web page, so that, when clicked, the user is taken to the result web page. Cards 210 may additionally include a caption having a brief description of the contents of the result and/or other information such as for example a URL for the result. A card 210 may also be selected with the mouse and moved on the interface 100. The cards 210 are shown as rectangular objects in FIG. 4. However, it is understood that the shape of the cards 210 may vary in alternative embodiments, and the size and aspect ratio may also vary in alternative embodiments.

The results having the highest relevance ranking are likely to be the most relevant search results for the user's formulated query, and are thus displayed within prime viewing area 130. Western cultures read language left to right and top to bottom. Thus, in embodiments, the results may be organized within prime viewing area 130 so that the result having the highest relevance ranking (e.g., card 210a) is displayed in the upper left hand corner of the prime viewing area 130. The search results having the next successively lower relevance rankings (e.g., cards 210b, 210c and 210d) may be displayed left to right on the first line within prime viewing area 130.

Other cultures read right to left and up to down, while further cultures read top to bottom and then left to right. It is thus understood that the position of cards 210 may be modified so that the cards decrease in priority right to left and then top to bottom, or top to bottom and then left to right, in further embodiments of the present system. The cards 210 and the prime viewing area 130 may be sized so that the number of rows and columns of cards 210 fitting within area 130 may vary.

In an embodiment of the present system, cards 210 are displayed in prime viewing area 130 in the proper order and position as follows. The present system may store the size (length and width) of cards 210. The system may also store or determine how many cards 210 fit horizontally and vertically within prime viewing area 130, as well as the position on interface 100 at which each of the cards 210 in prime viewing area 130 are to be displayed. For example, the present system may identify the (x, y) coordinates of the first position, second position, etc., for the cards 210 in prime viewing area 130. Thereafter, when relevance rankings have been determined and cards 210 are to be displayed in prime viewing area 130, the present system may position a corner, for example the upper eft hand corner, of a card at the identified (x, y) pixel positions.

As results in reserve viewing area 132 have a lower relevance ranking than those within prime viewing area 130, they are likely to be of less interest to the user than the results appearing in prime viewing area 130. Thus, the cards 210 within reserve viewing area 132 may be displayed grouped together in a cluster, for example as shown in FIG. 4. Other arrangements of the cards 210 within reserve viewing area 132 are contemplated. A similar convention as described in the preceding paragraph for placing the cards 210 may be used to display cards 210 within reserve viewing area 132, though the cards are positioned more densely with respect to each other.

While areas 130 and 132 have been described as being populated with cards 210, it is understood that these areas may be populated with other content representing the search results. For example, instead of cards 210, the areas 130 and 132 may be populated with text showing the search results.

Figure 5:
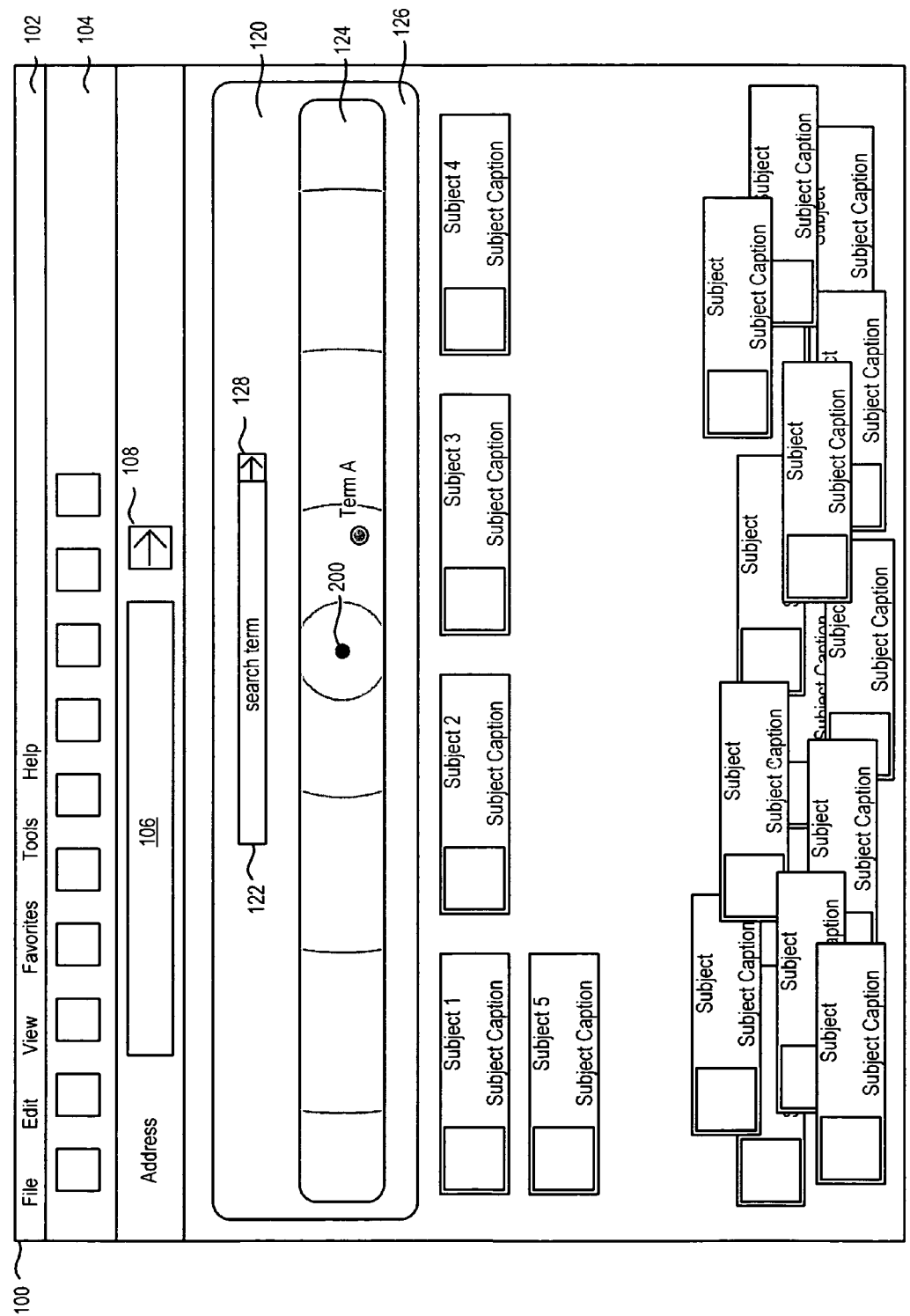

As shown in FIG. 5, a user may select the search term on the magnet bar (or elsewhere) with a keyboard and mouse or other pointing device and move the graphical object around interface 100. In step 186, the present system detects the position of the moved search term on display 100. As indicated above, moving a search term closer or farther from center magnet 200 increases and decreases, respectively, the importance of that search term in the downloaded results displayed in prime viewing area 130 and reserve viewing area 132. Once moved, the search term is displayed at its new position in step 188, and the present system again performs the step 168 of calculating the relevance ranking for the results using the new position of the search term on magnet bar 124.

If, on the other hand, no movement is detected in step 184, the present system next detects whether an additional search term has been entered in step 190. If no additional search term is entered in step 190, the present system performs no further functions. That is, if no movement of the search term on the magnet bar is detected, no additional search terms are entered, and none of the results are moved or selected to view their contents, the graphical interface 100 remains static.

If, on the other hand, in step 190, an additional search term is entered within search term field 122, the present system returns to step 162 and performs a new database search for the newly entered search term. The newly entered search term would be searched in either a structured or unstructured search as indicated above, and the results downloaded to local memory on the user's computing system. The new search term would be displayed on center magnet 200 in step 164, and then steps 166 through 190 would be repeated.

In accordance with a further aspect of the present system, once a new database search is performed on a newly added search term, the relevance ranking for all of the search results (existing search results and newly added search results) is calculated. As explained with reference to FIG. 6 hereinafter, this may have a few effects. First, newly added search results having a relevance ranking above the threshold are added to the prime viewing area 130. To the extent newly added results have higher relevance rankings than the existing search results, the cards 210 in the prime viewing area are reordered on the interface 100. Second, as a result of the recalculation of the relevance ranking of the existing search results, the relevance ranking for one or more of the existing results may fall below the priority threshold. In this instance, the cards 210 for these results are moved from the prime viewing area 130 to the reserve viewing area 132 on the interface.

Figure 6:
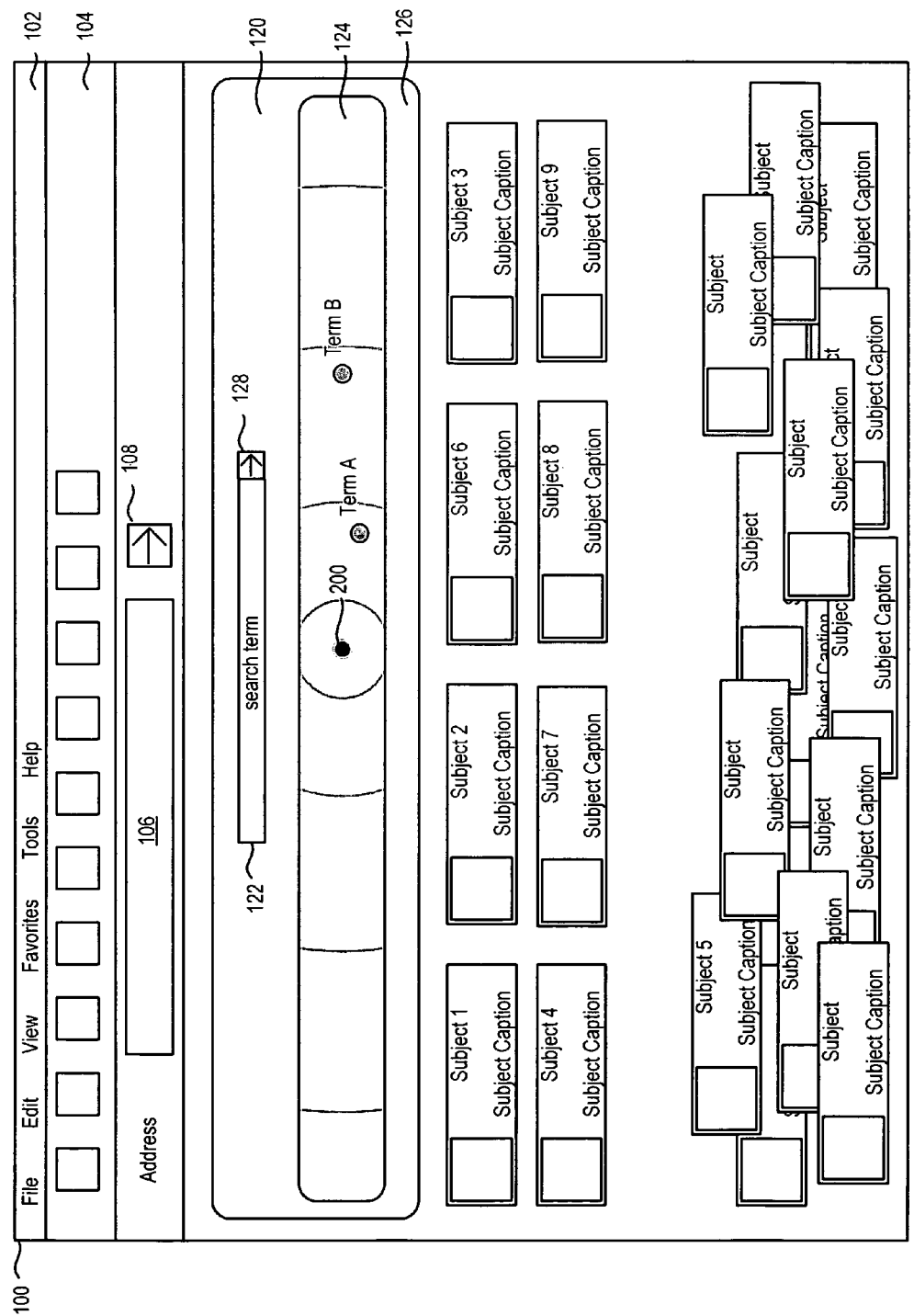

FIG. 6 illustrates an example where the user has added an additional search Term B to his or her search. In the interface 100 illustrated in FIG. 5, there was a single search Term A, which resulted in cards 210 for subjects 1, 2, 3, 4 and 5 being displayed, in that order, in prime viewing area 130. FIG. 6 includes Term A and Term B. The addition of Term B to the search results added a new card for result subject 6 in the third priority position, displacing subject cards 3 and 4 to lower priority positions. Moreover, upon recalculating the relevance ranking for the results with the addition of Term B, the new relevance ranking for result subject 5 fell below the priority threshold, and accordingly card 210 for subject 5 was moved from prime viewing area 130 to reserve viewing area 132.

It is noted that the ranking of results in the prime viewing area 130 shown in FIG. 6 is still dominated by results from Term A. However, had the user positioned Term B closer to magnet 200 than Term A on magnet bar 124 upon the addition of Term B, the results for Term B may have supplanted the results for Term A at the top positions.

Searching of the second term may generate one or more results which have already been returned upon a search of the first term (i.e., both terms are included within the result). In such event, the search results are combined to a single result which, in embodiments, would include weighting for both search terms, and possibly a bonus weighting, depending on the proximity of the terms on magnet bar 124 as explained hereinafter.

When a card 210 is repositioned upon a recalculation of relevance rankings (due to a movement of a search term closer or farther from center magnet 200 and/or due to the addition of a new search term), the present system may show the card moving from its old position to its new position so that the user may clearly see the impact of the moved and/or new search term on the results. Thus, the present system shows the movement across interface 100 from its old position to its new position. As the relevance ranking of many cards may be affected upon the movement and/or addition of a search term, all affected cards may be moved across interface 100 simultaneously. Alternatively, the cards may be moved one at a time to more clearly indicate to the user the impact of the moved and/or new search term.

In a further aspect of the present system, not only can a user set an overall importance of a search term in a search, the user may also indicate a relative importance of a first search term to a second search term. As explained hereinafter, a user may place two or more search terms close to one another on the magnet bar 124. In so doing, the user indicates that it is important that these two or more terms be linked together in the search results, and results having these two or more terms will receive a bonus to their overall relevance ranking. The actions of the present system in performing step 166 upon a determination that two or more search terms are within the proximity threshold of each other will now be described with reference to the graphical interface shown in FIG. 7 and the flowchart of FIG. 9.

Figure 7:
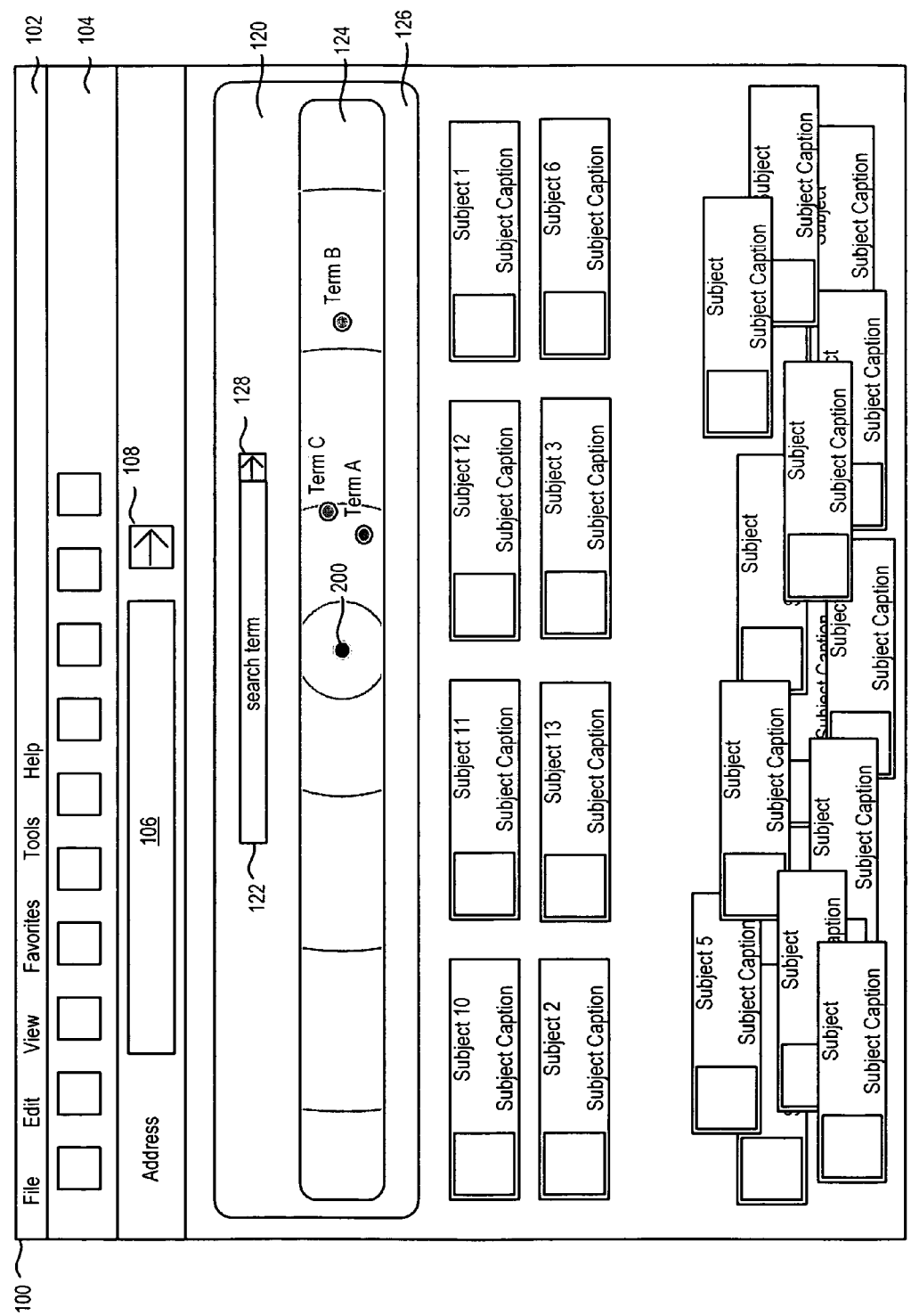

In the embodiment shown in FIG. 7, a third search term, Term C, has been searched, the results for search Term C have been downloaded to memory within the user's computing system, and the search Term C has been positioned on magnet bar 124 as desired by the user to reflect its importance. As indicated above, step 166 determines whether two or more search terms are within a proximity threshold of each other. The proximity threshold may be arbitrarily set in the present system. In embodiments, where the distance between center magnet 200 and the distal edge of magnet bar 124 is taken as 100% of the distance, the proximity threshold for two or more search terms may be between 3% and 15% of that distance, and more particularly between 3% and 5% of that distance. It is understood that the proximity threshold of two or more of the search terms may be less than 3% and greater than 15% in further embodiments.

Figure 9:
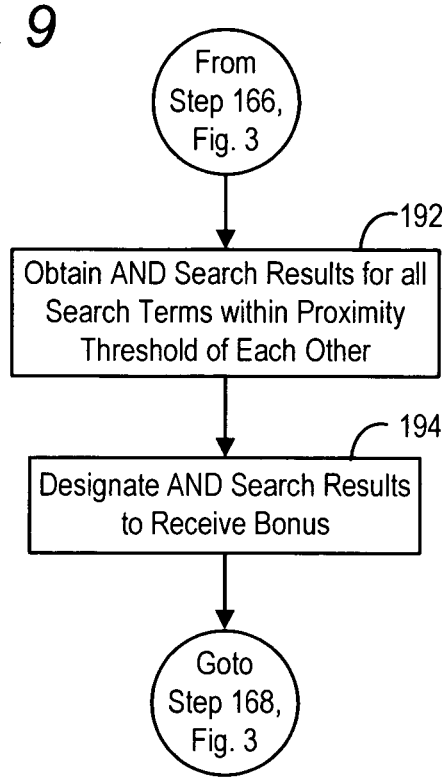
FIG. 9 is a flowchart showing the steps of awarding a bonus to search results including proximately located search terms according to embodiments of the present system.

In the embodiment of FIG. 7, Term C has been added to magnet bar 124 at a position to be within the proximity threshold of Term A. Accordingly, this condition is detected by the present system in step 166 and the present system performs steps 192 and 194 as shown in FIG. 9. In step 192, upon detecting two or more search terms within the proximity threshold, an additional search of all of the results returned from all of the search terms is performed by the present system. These results have already been downloaded to memory within the user's computing system, and no additional searching from external servers need be performed. However, in an alternative embodiment, the search performed in step 192 may be a brand new search of the Internet (in an unstructured search) or external database (in a structured search).

The search performed in step 192 is an "AND" search. That is, the search performed searches for all results including the two or more search terms that are within the proximity threshold of each other. In step 194, each of the results obtained in step 192 is designated to receive bonus points which increase the relevance ranking determined in step 168 as explained in greater detail hereinafter. Thus, in accordance with the present system, results are ranked by their importance not just due to how far the search terms are spaced from magnet 200, but also how closely the terms are positioned with respect to each other.

In the embodiment described above, only those search terms within the arbitrary proximity threshold are awarded a bonus under steps 192 and 194. However, in an alternative embodiment of the present system, the steps of performing the AND searching of terms on magnet bar 124, and the award of bonus points may be performed for each and every search term included on magnet bar 124. In such an embodiment, the bonus awarded to a given search result having two or more of the search terms would be higher or lower depending on whether the two search terms are closer or farther from each other, respectively, on magnet bar 124.

An embodiment for awarding a sliding scale bonus described in the preceding paragraph may operate as follows. First, the search results for each of the search terms by themselves is obtained as described above. Next, an AND search is performed for each combination of search terms on magnet bar 124. Thus, in FIG. 7 having three terms, a search would be performed for Terms A and B, Terms A and C, Terms B and C, and Terms A, B and C. For N search terms, there will be $2^N$-(N+1) combinations.

All results for each combination are then assigned a bonus. The bonus may be a sliding scale based on the distance between each of the terms. Thus, in the embodiment shown in FIG. 7, all results including both the Terms A and C would receive a higher bonus than all of the results including both the Terms A and B. For search results based on the combination of three or more terms, the distance used as the basis for determining the sliding scale bonus may be the largest of the distances between any two terms. Quantitatively, the amount of the bonus may either be based on incremental distances (i.e., terms which are x % apart from each other receive a bonus of a first percent, terms which are 2x % apart from each other receive a bonus of a second percent, terms which are 3x % apart from each other receive a bonus of a third percent, etc.). Alternatively, a mathematical algorithm may be used to calculate a bonus to be awarded results having two or more terms based on a spacing of those two or more terms on magnet bar 124. The above described embodiment for providing a slide scale bonus based on a proximity of all search terms may be particularly useful in unstructured searches.

In the example of the graphical user interface 100 shown in FIG. 7, the addition of search Term C and the proximity of search Terms A and C on magnet bar 124 resulted in a reordering of the search results shown in FIG. 6. New cards 10, 11 and 12 have the highest relevance ranking, followed by cards 1, 2, 13, 3 and 6. The cards 4, 7, 8 and 9 shown in FIG. 6 from search Terms A and B by themselves were moved to the reserve viewing area 132 as a result of their relevance ranking going below the priority threshold upon the introduction of new search Term C. This is by way of illustrative example only, and a wide variety of other ranking combinations may of course occur.

Figure 8:
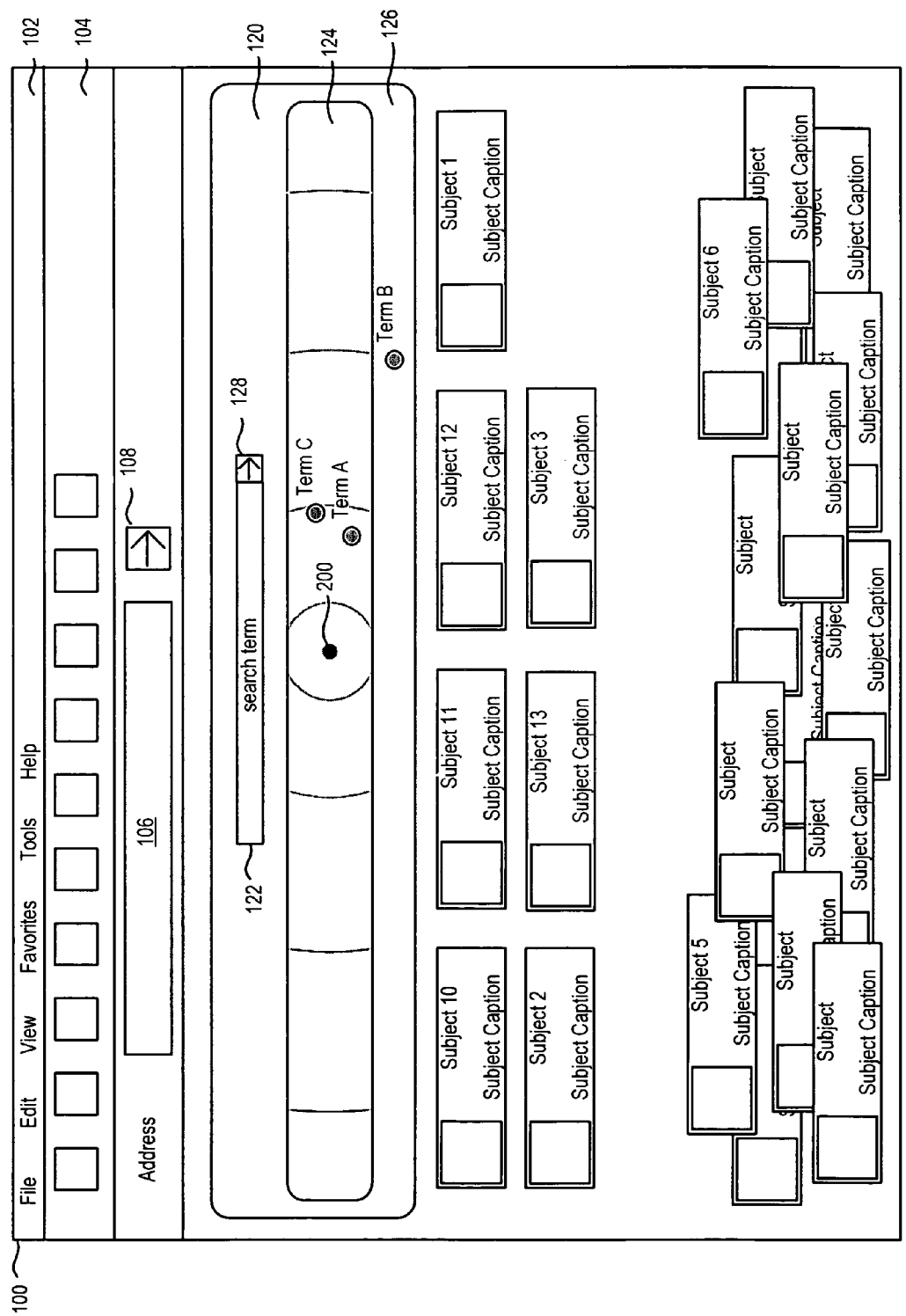

When a search term is removed from magnet bar 124, the effect of that search term on the relevance ranking is removed (in effect, its importance goes to 0). Thus, as shown in the graphical user interface of FIG. 8, upon moving search Term B to the inactive area 126, the new calculations of the relevance ranking for all results lowered the relevance ranking of card 6 to below the priority threshold and accordingly card 6 was moved to reserve viewing area 132. The reordering of cards in FIG. 8 is by way of illustrative example only, and other rankings may occur upon removal of a term from the magnet bar 124.

Figure 10:
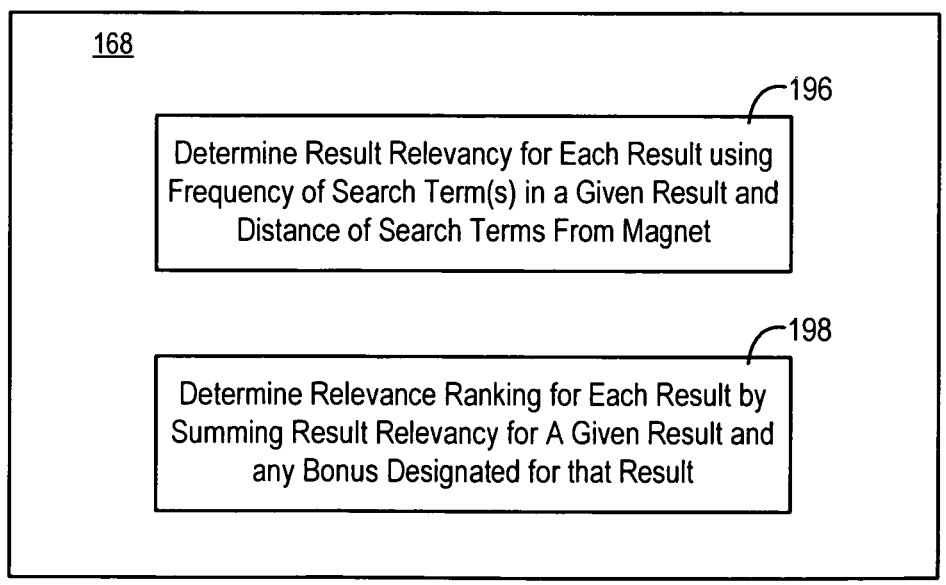
FIG. 10 is a flowchart showing additional details of the calculation step 168 in FIG. 3.

Those of skill in the art will appreciate that various mathematical algorithms and rules may be used for calculating the relevance ranking of each result in step 168 for a given set of search terms. In general, as shown in FIG. 10, step 168 includes a first step 196 of determining a result relevancy for each result using the frequency of each search term in a given result and the distance of the search terms from the center magnet 200. This is a component of the overall relevance ranking due to the distance of the respective search terms from center magnet 200. In step 198, the overall relevance ranking for each result is determined by summing the average result relevancy for a given search and any bonus designated to that result:

relevance ranking=average result relevancy+bonus.

Figure 11:
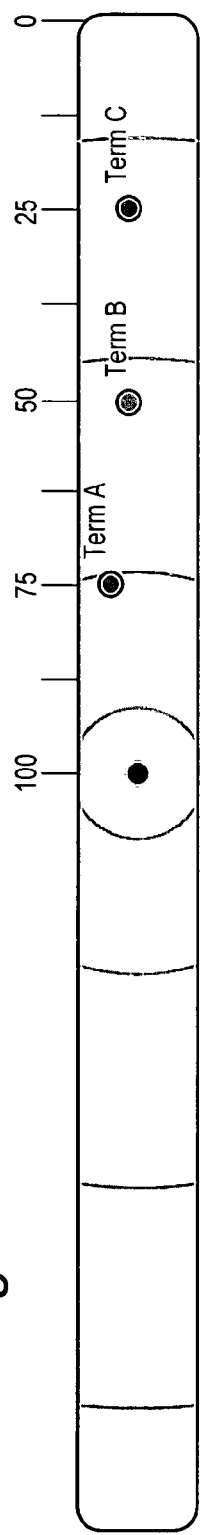
FIGS. 11 and 12 are graphical representations of a magnet bar including numerical indications of the proximity of search terms from the center magnet.

One example of a mathematical method according to the present system for determining the relevance ranking for a group of results based on given search terms on magnet bar 124 is now explained with reference first to FIG. 11 and then FIG. 12. In FIG. 11, a user has entered three separate search queries, one for Term A, one for Term B and one for Term C, and then positioned the terms on the magnet bar as shown. A determination of a relevance ranking for each result may begin by defining the distance from the center magnet 200 to the end of the magnet bar to be 100% of the available distance for placement of terms (placement of terms on the opposite side of center magnet 200 is explained hereinafter). The percentage designations shown on FIG. 11 would not appear in embodiments of the user interface 100, though the designations may appear in alternative embodiments.

Using this convention, the user has placed Term A 75% of the distance toward center magnet 200, Term B 50% of the distance toward center magnet 200 and Term C 25% of the distance toward center magnet 200. Qualitatively, as indicated above, this is an indication by the user that Term A is more important than Terms B and C in the results, and Term B is more important than Term C in the results.

In embodiments, quantitatively, for n search terms which result in M results, the intermediate result relevancy for each result may be given by:

$$\text{Result 1:}$$
$$((\text{Frequency of Term 1 in Result 1} * \text{Distance of Term 1 from Magnet}) +$$
$$(\text{Frequency of Term 2 in Result 1} * \text{Distance of Term 2 from Magnet}) + \ldots + (\text{Frequency of Term } n \text{ in Result 1} * \text{Distance of Term } n \text{ from Magnet}))/n$$

$$\text{Result 2:}$$
$$((\text{Frequency of Term 1 in Result 2} * \text{Distance of Term 1 from Magnet}) +$$
$$(\text{Frequency of Term 2 in Result 2} * \text{Distance of Term 2 from Magnet}) + \ldots + (\text{Frequency of Term } n \text{ in Result 2} * \text{Distance of Term } n \text{ from Magnet}))/n$$

$$\vdots$$

$$\text{Result } M:$$
$$((\text{Frequency of Term 1 in Result } M * \text{Distance of Term 1 from Magnet}) +$$
$$(\text{Frequency of Term 2 in Result } M * \text{Distance of Term 2 from Magnet}) + \ldots + (\text{Frequency of Term } n \text{ in Result } M * \text{Distance of Term } n \text{ from Magnet}))/n$$

In the embodiment shown in FIG. 11, assume three results (there may be many more, but three results are used to illustrate the calculation here). The frequency of the search terms A, B and C in those results is set forth in Table 1:

TABLE 1

| | Frequency of Term A in Result | Frequency of Term B in Result | Frequency of Term C in Result |
|---|---|---|---|
| Result 1 | 20 times | 5 times | 1 times |
| Result 2 | 2 times | 15 times | 0 times |
| Result 3 | 0 times | 3 times | 10 times |

The above frequencies may be converted to percentages for the purposes of calculating the result relevancy. Thus, given the term positions of FIG. 11 and the above frequency of terms in the result, the intermediate result relevancy may be given by:

$$((0.20*0.75)+(0.05*0.5)+(0.01*0.25))/3=0.0592 \quad \text{Result 1:}$$

$$((0.02*0.75)+(0.15*0.5)+0)/3=0.0300 \quad \text{Result 2:}$$

$$(0+(0.03*0.5)+(0.1*0.25))/3=0.0133 \quad \text{Result 3:}$$

To determine what bonus to add to the result relevancy, in embodiments, the system determines whether any search terms are within the proximity threshold to each other. Assuming a proximity threshold of, for example, 5%, no such terms exist in the example of FIG. 11. Thus the relevance ranking for the three results are given by the result relevancy:
Result 1: 0.0592
Result 2: 0.0300
Result 3: 0.0133

In an embodiment where the priority threshold was arbitrarily set at 0.055, only the result 1 would be displayed as a card 210 within prime viewing area 130. The other results would be displayed in reserve viewing area 132.

Figure 12:
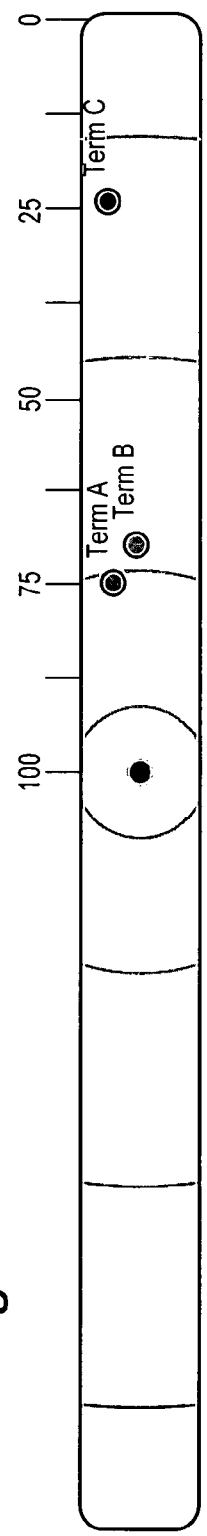

In the embodiment of FIG. 12, the user has moved the Term B closer to Term A and the center magnet 200. Thus, Term A is 75% of the distance toward center magnet 200, Term B is 70% of the distance toward center magnet 200 and Term C is 25% of the distance toward center magnet 200.

The result relevancy for the three results would then be:

$$((0.20*0.75)+(0.05*0.7)+(0.01*0.25))/3=0.0625 \quad \text{Result 1:}$$

$$((0.02*0.75)+(0.15*0.7)+0)/3=0.0400 \quad \text{Result 2:}$$

$$(0+(0.03*0.7)+(0.1*0.25))/3=0.0153 \quad \text{Result 3:}$$

Next, the search terms are checked for proximity. Assuming a proximity threshold of 5%, search Terms A and B are within the proximity threshold and a bonus is added to any results having both Term A and Term B. Upon the further AND search, the present system determines that Result 1 has both Terms A and B, and Result 2 has both Terms A and B. In embodiments, an arbitrary bonus may be awarded to all results having both terms. For example, every result having both terms may receive an additional 0.02 bonus. It is understood that the bonus may be larger or smaller than 0.02 in alternative embodiments. Thus, the relevance ranking for the three results would be:

$$0.0625+0.02=0.0825 \quad \text{Result 1:}$$

$$0.0400+0.02=0.0600 \quad \text{Result 2:}$$

Result 3: 0.0153

Thus, it can be seen that by moving Term B closer to the center magnet 200 and Term A, the relevance ranking for all three results increased. Results 1 and 2 also received a bonus as including terms which were proximately located to each other on the magnet bar. Additionally, assuming the same priority threshold of 0.055, moving Term B closer to the center magnet 200 and Term A moved the Result 2 up into the prime viewing area 130.

It is understood that the bonus may be calculated by other means. For example, the frequency with which the two or more proximate terms appear in the result may be considered. In the above example, there were 5 pairs of Terms A and B in Result 1 (Term B, appearing 5 times, is the limiting factor on the number of pairs) and 2 pairs of Terms A and B in Result 2. The Result 1 may accordingly receive a greater bonus for having more occurrences of both Terms A and B.

Moreover, as explained above, instead of awarding an arbitrary bonus, the bonus may additionally be based on how proximate terms are, not just whether they are above or below a threshold value.

In the above embodiments, the intermediate result relevancy was calculated using weightings from multiple search terms when present in a given result. In an alternative embodiment, a result relevancy may be determined based solely and entirely on a single search term and its proximity to the center magnet 200. Thus, for example referring to the three search terms shown in FIG. 11, a first set of results would be generated for Term A, with the highest result relevancy going to the result having the highest frequency of the Term A in the result. Similarly, a second set of results would be generated for Term B, with the highest result relevancy going to the result having the highest frequency of the Term B in the result. And a third set of results would be generated for Term C, with the highest result relevancy going to the result having the highest frequency of the Term C in the result.

As described above, in embodiments, when a second search returns a result already identified from the search on the first term, those two identical results are consolidated together. In the embodiment described in the preceding paragraph, the results would not be consolidated. For example, if a single result included both Term A and Term B, a first result would include a result relevancy due to the frequency of the Term A, and a second result would have a result relevancy due to the frequency of Term B.

In the embodiment described above where results are due to a single term instead of the terms together, the prime viewing area 130 may include results for any one or more of the search terms, depending on which results generated the highest result relevancy. In a further alternative embodiment of the system, the prime viewing area 130 may display only results generated from a first term, or a second term, or a third term, etc. In this embodiment, whichever term were closest to center magnet 200 would have its results displayed in prime viewing window 130, in order of their relevancy ranking and for those results exceeding priority threshold. This embodiment operates identically to an embodiment where all terms other than the term closest to the center magnet are removed from magnet bar 124.

Figure 13:
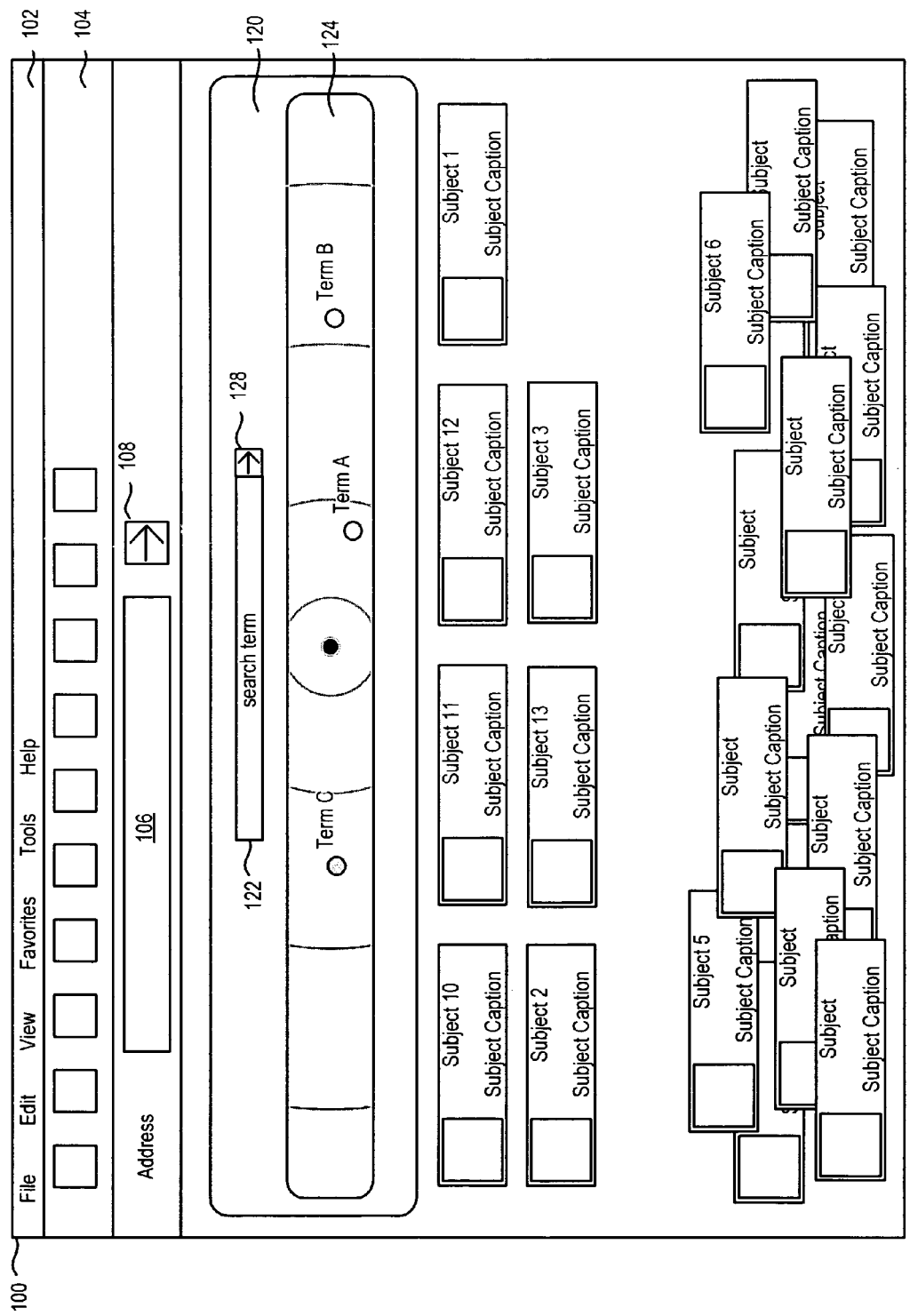
FIG. 13 is an illustration of a graphical user interface including a magnet bar and search results according to an embodiment of the present system.

FIG. 13 illustrates a graphical user interface 100 according to a further embodiment of the present system. As shown therein, magnet bar 124 includes search Term A and search Term B as described above. Magnet bar 124 further includes a search Term C on the opposite side of the center magnet 200 from Terms A and B. Inclusion of a search term on the opposite side of center magnet 200 may be treated as a "BUT NOT" search of the terms. The results may include results including Term A and/or Term B, but not Term C. According to this embodiment, all results including Term C may automatically be removed from the pool of results displayed in prime viewing window 130 or reserve viewing window 132. Alternatively, inclusion of a search term on the opposite side of center magnet 200 may merely impose a penalty, depending on the distance between the search term and the center magnet 200. The penalty may simply be an amount subtracted from the result relevancy, with a penalty increasing as the search term on the opposite side is moved farther away from the center magnet. It is understood that the penalty may alternatively increase as the term on the opposite side of the magnet gets closer to the magnet.

The embodiments described above with respect to FIGS. 1 through 13 provide an easy to use and easy to understand graphical user interface where a user may easily change the relative importance of a search term and have the effect of that change of importance immediately show up in a new ranking of the results for the user's search. Moreover, all reordering of search results upon a change of importance of one or more of the search terms may be done without performing a brand new search of the Internet or external structured database. All operations for reordering results are performed on the results which have been downloaded and stored in local memory.

It is understood that the present system may be used on a wide variety of graphical user interfaces outside of those used for search queries. One such additional embodiment relates to the easy customization, modification and prioritization of content on a user's homepage as shown for example in FIGS. 14 and 15. In particular, a graphical interface 100' may be a user's homepage presented by a browser over a user's display. Graphical user interface 100' includes toolbar 102 with several drop down menus as described above. User interface 100' may be provided within an Internet browser, such as for example Internet Explorer from Microsoft Corporation. Graphical user interface 100' also includes toolbar 104, which may include several tools as described above. The browser also includes address field 106 and a "go" button 108.

Figure 14:
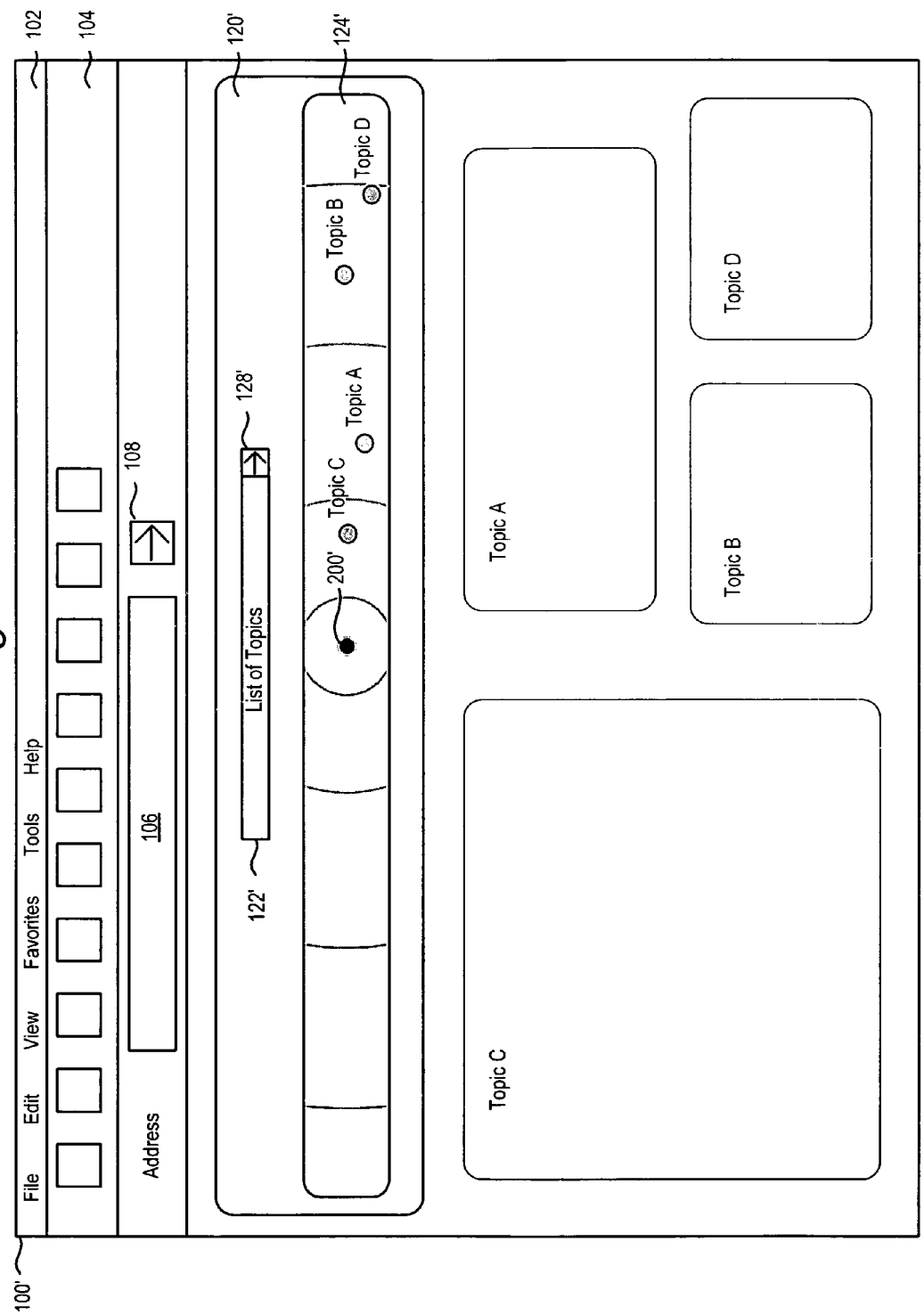
FIGS. 14 and 15 are illustrations of a graphical user interface according to a further embodiment of the present system including a magnet bar for positioning objects on the web page.
Figure 15:
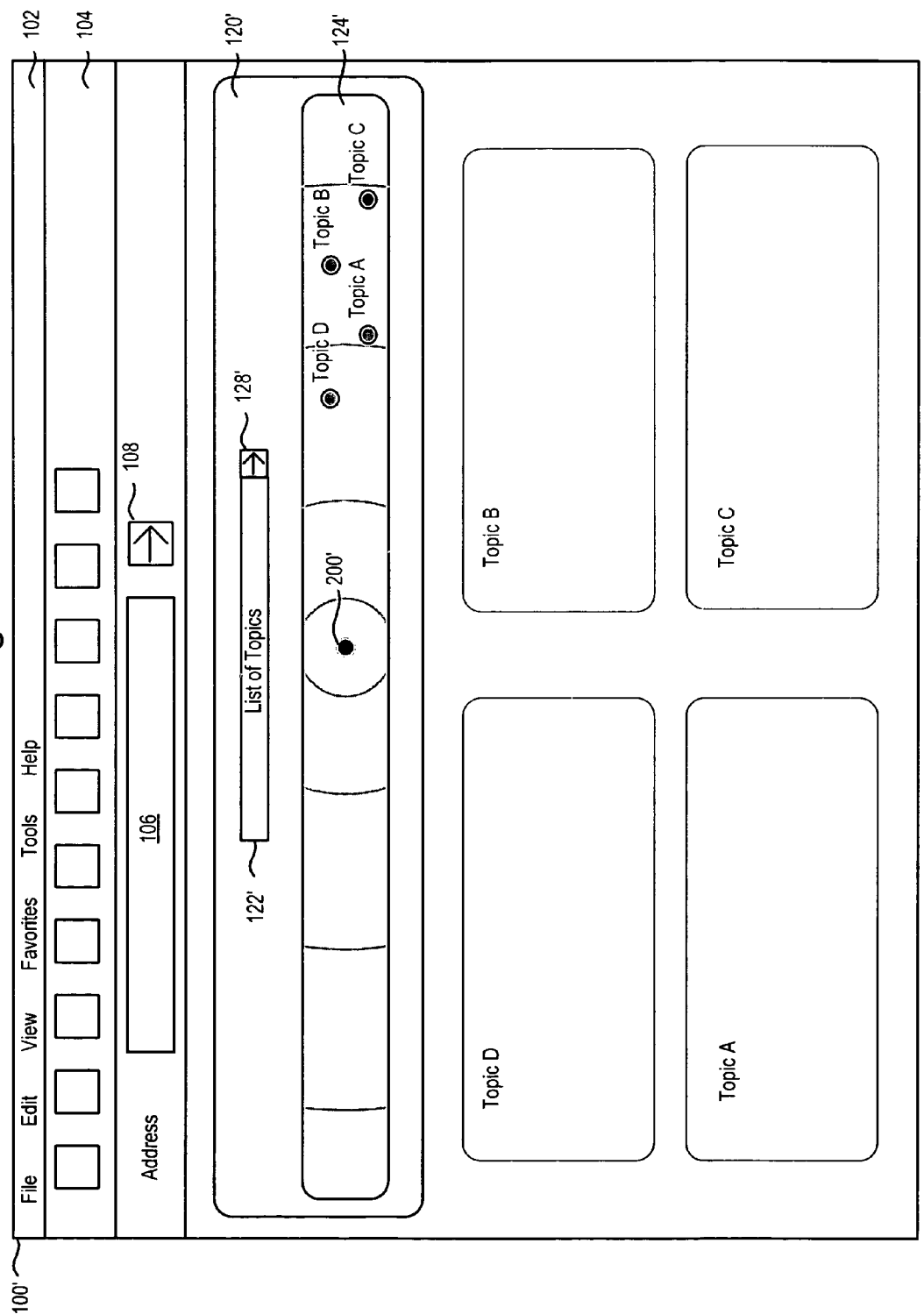

In accordance with the embodiment shown in FIGS. 14 and 15, a user may quickly and easily populate his or her homepage by selecting desired topics from a list of topics in a topic field 122' and indicating this election by clicking on button 128'. Once a topic is selected, it is positioned on magnet bar 124' as described above. In particular, the topic which is positioned closest to center magnet 200' will be given the highest priority position (top left hand side in embodiments) on the content section of the user's homepage. The next closest topic on the user's homepage is determined by the position of the next closest topic on magnet bar 124'. Those topics which are located farther from center magnet 200' may be included on the interface 100', but may receive lower priority position on the content section of the user's homepage.

Additionally, as seen in FIG. 14, those topics which are located closest to center magnet 200' may receive more real estate on the user's homepage so that more content from that topic may be displayed. As shown in FIG. 15, a user may quickly and easily redesign the contents of their homepage by moving the topics around within magnet bar 124'. Additionally, the space allotted to each topic within the content section of the user's homepage may be controlled by the relative distances of the topics from magnet center 200' on magnet bar 124' as shown in FIG. 15.

It is understood that a graphical user interface for easy customization and reorganization may be used for applications other than a browser presenting a web page. For example, many software application programs, such as for example productivity application programs including word processing application programs, spreadsheet application programs, presentation application programs, drawing programs, etc. include large numbers of icons on the interface for presenting various functionalities of the application program. In further embodiments of the present system, a magnet bar including a center magnet as described above may be provided on the user interface, together with a field having a list of the application program functions. A user may then select the functions from the list to populate the user interface. These functions would also appear within the magnet bar. By arranging the selected functions on the magnet bar, a user may quickly and easily prioritize those functions which are most important to the user. Additionally, those functions appearing closest to the center magnet may be granted additional real estate on the user interface and expanded to display more detail and user options for those functions.

In a further embodiment of the present system, a magnet bar as described above may be incorporated into a user interface for an email application program. At present, it is frequently a difficult task to search through large folders of emails to find a desired email. In accordance with the present system, a user could input desired search terms related to desired emails, and then have those terms appear in a magnet bar. Thereafter, a user can weight the various selected terms relative to each other based on their position away from the center magnet. The mail database would then be searched according to the prioritized criteria set on the magnet bar.

Some additional contexts in which the present system as described above may be used in a browser setting include:

Searching for an educational institution—by inputting desired criteria, a user may quickly generate search results for educational institutions, and then quickly and easily reorder those results by changing the importance of the search terms which generated those results.

Finding a career—enter career criteria and change priority of terms to reorder the results.

Finding a home or real estate.

Selecting a book or music.

Social networking and dating.

Diagnosing a medical condition—by plugging in symptoms a user may find an indicated disease or disability.

Finding vacation locations.

Shopping.

Figure 16:
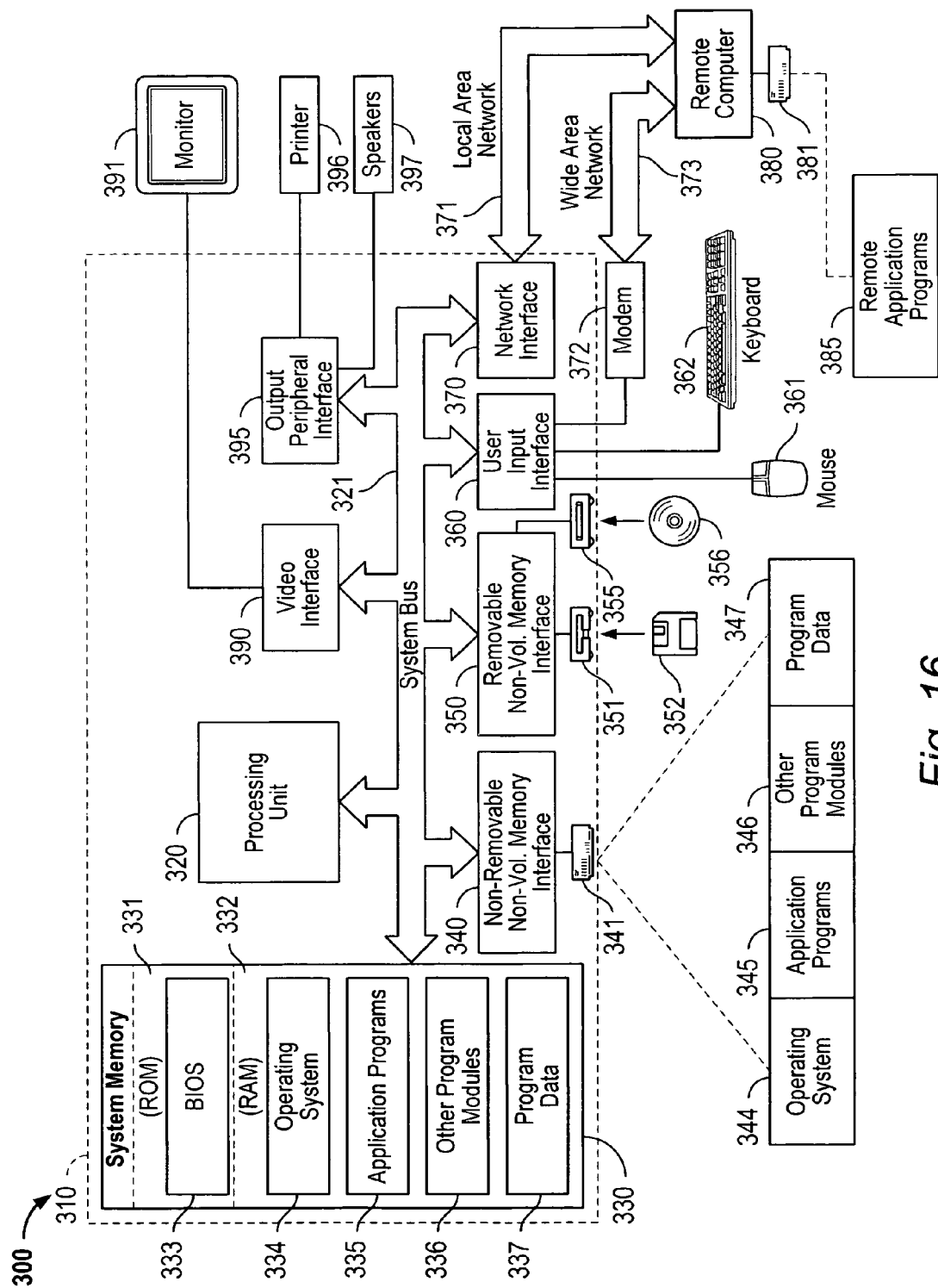
FIG. 16 is a block diagram of an embodiment of a computing system for implementing the present system.

FIG. 16 illustrates an example of a suitable general computing system environment 300 that may comprise any processing device shown herein on which the inventive system may be implemented. The computing system environment 300 is only one example of a suitable computing environment and is not intended to suggest any limitation as to the scope of use or functionality of the inventive system. Neither should the computing system environment 300 be interpreted as having any dependency or requirement relating to any one or combination of components illustrated in the exemplary computing system environment 300.

The inventive system is operational with numerous other general purpose or special purpose computing systems, environments or configurations. Examples of well known computing systems, environments and/or configurations that may be suitable for use with the inventive system include, but are not limited to, personal computers, server computers, multiprocessor systems, microprocessor-based systems, set top boxes, programmable consumer electronics, network PCs, minicomputers, mainframe computers, laptop and palm computers, hand held devices, distributed computing environments that include any of the above systems or devices, and the like.

With reference to FIG. 16, an exemplary system for implementing the inventive system includes a general purpose computing device in the form of a computer 310. Components of computer 310 may include, but are not limited to, a processing unit 320, a system memory 330, and a system bus 321 that couples various system components including the system memory to the processing unit 320. The system bus 321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 310 may include a variety of computer readable media. Computer readable media can be any available media that can be accessed by computer 310 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, random access memory (RAM), read only memory (ROM), EEPROM, flash memory or other memory technology, CD-ROMs, digital versatile discs (DVDs) or other optical disc storage, magnetic cassettes, magnetic tapes, magnetic disc storage or other magnetic storage devices, or any other medium which can be used to store the desired information and which can be accessed by computer 310. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 330 includes computer storage media in the form of volatile and/or nonvolatile memory such as ROM 331 and RAM 332. A basic input/output system (BIOS) 333, containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 16 illustrates operating system 334, application programs 335, other program modules 336, and program data 337.

The computer 310 may also include other removable/non-removable, volatile/nonvolatile computer storage media. By way of example only, FIG. 16 illustrates a hard disc drive 341 that reads from or writes to non-removable, nonvolatile magnetic media and a magnetic disc drive 351 that reads from or writes to a removable, nonvolatile magnetic disc 352. Computer 310 may further include an optical media reading device 355 to read and/or write to an optical media.

Other removable/non-removable, volatile/nonvolatile computer storage media that can be used in the exemplary operating environment include, but are not limited to, magnetic tape cassettes, flash memory cards, DVDs, digital video tapes, solid state RAM, solid state ROM, and the like. The hard disc drive 341 is typically connected to the system bus 321 through a non-removable memory interface such as interface 340, magnetic disc drive 351 and optical media reading device 355 are typically connected to the system bus 321 by a removable memory interface, such as interface 350.

The drives and their associated computer storage media discussed above and illustrated in FIG. 16, provide storage of computer readable instructions, data structures, program modules and other data for the computer 310. In FIG. 16, for example, hard disc drive 341 is illustrated as storing operating system 344, application programs 345, other program modules 346, and program data 347. These components can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through input devices such as a keyboard 362 and a pointing device 361, commonly referred to as a mouse, trackball or touch pad. Other input devices (not shown) may include a microphone, joystick, game pad, satellite dish, scanner, or the like. These and other input devices are often connected to the processing unit 320 through a user input interface 360 that is coupled to the system bus 321, but may be connected by other interface and bus structures, such as a parallel port, game port or a universal serial bus (USB). A monitor 391 or other type of display device is also connected to the system bus 321 via an interface, such as a video interface 390. In addition to the monitor, computers may also include other peripheral output devices such as speakers 397 and printer 396, which may be connected through an output peripheral interface 395.

The computer 310 may operate in a networked environment using logical connections to one or more remote computers, such as a remote computer 380. The remote computer 380 may be a personal computer, a server, a router, a network PC, a peer device or other common network node, and typically includes many or all of the elements described above relative to the computer 310, although only a memory storage device 381 has been illustrated in FIG. 16. The logical connections depicted in FIG. 16 include a local area network (LAN) 371 and a wide area network (WAN) 373, but may also include other networks. Such networking environments are commonplace in offices, enterprise-wide computer networks, intranets and the Internet.

When used in a LAN networking environment, the computer 310 is connected to the LAN 371 through a network interface or adapter 370. When used in a WAN networking environment, the computer 310 typically includes a modem 372 or other means for establishing communication over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device. By way of example, and not limitation, FIG. 16 illustrates remote application programs 385 as residing on memory device 381. It will be appreciated that the network connections shown are exemplary and other means of establishing a communication link between the computers may be used.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

We claim:

1. A method of displaying content on a graphical user interface in a ranked order, the method comprising the steps of:
    (a) displaying a reference position on the graphical user interface;
    (b) receiving input from the user with respect to at least two criteria;
    (c) displaying at least first and second movable graphical objects, representative of the input received by the user in said step (b), on the graphical user interface, positions at which the movable graphical objects are displayed representing a relative importance to the user of each of the at least two criteria;
    (d) detecting a position of the first and second graphical objects on the graphical user interface;
    (e) detecting a position of the first graphical object with respect to the second graphical object;
    (f) awarding a bonus when the first and second graphical objects are spaced from each other but within one of first and second a predefined distances distance of each other, the bonus increasing the relevance of an item of content in a ranked order of the content and the bonus for being within the first predefined distance of each other being greater than the bonus for being within the second predefined distance of each other; and
    (g) positioning the content in ranked order on the graphical user interface, the ranked order based at least in part on a proximity of the graphical objects to the reference position, and in part on any bonus due to the proximity of the first graphical to the second graphical object.

2. The method recited in claim 1, wherein said step (b) of receiving input comprises the step of receiving two or more search queries and said step (g) of positioning the content on the graphical user interface comprising the step of displaying the search results.

3. The method recited in claim 1, wherein said step (b) of receiving input comprises the step of receiving a selection of two or more content topics and said step of positioning the content on the graphical user interface comprising the step of displaying the two or more selected content topics on a webpage.

4. The method recited in claim 3, wherein said step (g) of positioning the content in ranked order on the graphical user interface comprises the step of displaying a first selected content topic in a higher priority position on the graphical user interface than a second selected content topic where the graphical object representative of the first content topic is positioned closer to the reference position than the graphical object representative of the second content topic.

5. The method recited in claim 4, further comprising the step of repositioning the second selected content topic to a higher priority position on the graphical user interface than the first selected content topic where the graphical object representative of the second content topic is repositioned closer to the reference position than the graphical object representative of the first content topic.

6. The method recited in claim 3, wherein said step (g) of positioning the content in ranked order on the graphical user interface comprises the step of displaying a first selected content topic over a larger area on the graphical user interface than a second selected content topic where the graphical object representative of the first content topic is positioned closer to the reference position than the graphical object representative of the second content topic.

7. The method recited in claim 6, further comprising the step of changing the relative sizes of the areas over which the first and second selected topics are displayed on the graphical user interface where the graphical object representative of the second content topic is repositioned closer to the reference position than the graphical object representative of the first content topic.

8. A method of displaying results of a database search on a graphical user interface in a ranked order, the method comprising the steps of:
   (a) displaying a reference position on the graphical user interface;
   (b) receiving at least two queries to be searched in the database;
   (c) receiving the results generated based on the queries;
   (d) displaying at least two movable graphical objects, representative of the queries received by the user in said step (b), on the graphical user interface;
   (e) detecting a position of the graphical objects on the graphical user interface;
   (f) awarding a bonus when the graphical objects are within a predefined distance of each other, the bonus increasing the relevance of a result in a ranked order of the results and the bonus being awarded on a sliding scale proportional to a distance between the graphical objects; and
   (g) positioning the results in ranked order on the graphical user interface, the ranked order based at least in part on a proximity of the graphical objects to the reference position, a bonus award to a result, and the frequency of the queries in the results.

9. The method recited in claim 8, said step (a) of displaying a reference position on the graphical user interface comprising the step of displaying a first graphical object on the graphical user interface and displaying a second, smaller graphical object at at least the approximate center of first graphical object.

10. The method recited in claim 8, wherein said step (f) of positioning the results in ranked order on the graphical user interface comprises the step of increasing a ranking of a result including a query where the graphical object representative of the query is moved closer to the reference position.

11. The method recited in claim 8, wherein said step (f) of positioning the results in ranked order on the graphical user interface comprises the step of displaying the highest ranked result in a highest priority position on the graphical user interface, and displaying a group of successively lower ranked results in successively lower priority positions on the graphical user interface.

12. The method recited in claim 8, wherein said step (f) of positioning the results in ranked order on the graphical user interface comprises the step of reordering the results displayed in the priority positions upon a repositioning of a search term relative to the reference position.

13. The method recited in claim 12, wherein said step of reordering the results displayed in the priority positions upon a repositioning of a search term relative to the reference position occurs without performing a new search of the database.

14. A method of ranking results of a database search, comprising the steps of:
   (a) receiving a plurality of queries to be searched;
   (b) receiving an indication of an importance of the plurality of queries by positioning query objects representing the queries on a graphical user interface;
   (c) receiving an indication of an importance of a first query of the plurality of queries relative to a second query of the plurality of queries, such that two queries indicated to have a high importance relative to each other provide a bonus to a search result having a high frequency of the two queries together, the bonus increasing the relevance of that search result in a ranking of the search results and the amount of the bonus awarded to a pair of queries dependent on a distance between the pair of query objects for the pair of queries such that the pair of queries receive a first bonus when the pair of query objects are a first distance away from each other, a second bonus greater than the first bonus when the pair of query objects are a second distance away from each other and a third bonus greater than the second bonus when the pair of query objects are a third distance away from each other, the first distance being greater than the second distance and the second distance being greater than the third distance; and
   (d) basing the ranking of the search results at least in part on the importance of the plurality of queries indicated in said step (b), and the importance of the first query relative to the second query indicated in said step (c).

15. The method recited in claim 14, wherein said step (d) of basing the ranking of the search results at least in part on the importance of the first query relative to the second query indicated in said step (c) comprises the step of increasing the ranking of a result including the first and second queries where the importance of the first query relative to the second query indicated in said step (c) is above a designated threshold.

16. The method recited in claim 14, wherein said step (d) of basing the ranking of the search results at least in part on the importance of the first query relative to the second query indicated in said step (c) comprises the step of increasing the ranking of a result including the first and second terms as the importance of the first term relative to the second term indicated in said step (c) increases.

17. The method recited in claim 14, wherein said step (d) of basing the ranking of the search results at least in part on the importance of the plurality of queries indicated in said step (b), and the importance of the first query relative to the second query indicated in said step (c) comprises the step of reordering the ranking of the search results, without performing a new search of the database, upon at least one of a change in the importance of a query of the plurality of queries in said step (b) or a change in the importance of the first query relative to the second query in said step (c).

* * * * *